United States Patent [19]

Petrak et al.

[11] Patent Number: 5,713,579
[45] Date of Patent: Feb. 3, 1998

[54] DYNAMIC SEAL

[76] Inventors: Gregory H. Petrak, 16488 W. 55th Dr., Golden, Colo. 80403; Anthony E. Smolinski, 5256 Daleside Ave., Parma, Ohio 44134

[21] Appl. No.: 721,729

[22] Filed: Sep. 27, 1996

Related U.S. Application Data

[60] Provisional application No. 60/004,652, Oct. 2, 1995.

[51] Int. Cl.$^6$ ............................................. F16J 9/00
[52] U.S. Cl. ................................. 277/37; 277/38; 277/95; 277/152
[58] Field of Search .................................. 277/37, 38, 39, 277/58, 65, 95, 152, 153

[56] References Cited

U.S. PATENT DOCUMENTS

| | | | |
|---|---|---|---|
| 3,822,890 | 7/1974 | Bourgeois | 277/95 |
| 4,376,541 | 3/1983 | Walter et al. | 277/153 |
| 4,427,202 | 1/1984 | Backlin | 277/95 |
| 4,848,776 | 7/1989 | Winckler | 277/153 |
| 4,943,068 | 7/1990 | Hatch et al. | 277/152 |
| 5,015,001 | 5/1991 | Jay | 277/37 |
| 5,183,269 | 2/1993 | Black et al. | 277/37 |
| 5,201,529 | 4/1993 | Heinzen | 277/37 |
| 5,269,536 | 12/1993 | Matsushima et al. | 277/37 |

*Primary Examiner*—Daniel G. DePumpo
*Attorney, Agent, or Firm*—John E. Reilly

[57] ABSTRACT

A radial seal and facial excluder seal are mounted on separate rings but installed in combination so that the excluder seal always maintains sealing engagement with its intended counterface notwithstanding wide axial assembly tolerances between the shaft and bore on which the seals are mounted, the excluder seal also serving to prevent contamination from coming into contact with the radial seal, and the ring on which the excluder seal is mounted serves as a guide for installation of the shaft past the radial seal in such a way as to reduce occurrence of damage to the radial seal as a result of sharp splines or other imperfections on the shaft.

16 Claims, 7 Drawing Sheets

DYNAMIC SEAL

CROSS-REFERENCE TO RELATED APPLICATION

This application is a continuation-in-part of Provisional application Ser. No. 60/004,652, filed Oct. 2, 1995, for DYNAMIC SEAL by Gregory H. Petrak.

BACKGROUND AND FIELD OF INVENTION

This invention relates to seals, and more particularly relates to annular seals of the type to be mounted on a rotating shaft, such as, a wheel oil seal installed between a rotating shaft and outer surrounding stationary housing of a motor vehicle.

Empirical testing has shown that in highly contaminated environments the life of a radial seal which is installed in the housing to sealingly engage the rotating shaft can be extended significantly when combined with a facial excluder seal installed outboard of the radial seal to prevent abrasive contaminants from coming into contact with the radial seal. When the shaft and housing are subject to even small amounts of axial displacement relative to one another, the facial excluder seal is highly effective to prevent the ingress of contaminants. In the past, it has been the practice to install the shaft prior to insertion of the shaft through the radial seal and into the bore of the housing but generally has not been found to be satisfactory where there are wide tolerance ranges with respect to positioning of the shaft axially relative to the housing or where very narrow axial spaces are available in which to install both the radial seal and facial excluder seal. Moreover, when the radial seal is installed independently of the excluder seal and the shaft then inserted through the radial seal, the radial seal can be damaged if there are sharp splines or other imperfections on the shaft which can cut or nick the seal as the shaft passes therethrough. It is therefore desirable that the radial seal and facial excluder seal be preassembled and installed in combination in such a manner that the excluder seal maintains sealing engagement with its intended counterface irrespective of wide axial assembly tolerances which may exist between the shaft and housing and in such a way that they can fit into narrow axial spaces. Still further, it is desirable that the portion of the assembly supporting the facial excluder seal act as a guide or pilot when the shaft is inserted through the seal assembly to prevent damage to the radial seal.

SUMMARY OF INVENTION

It is therefore an object of the present invention to provide for a novel and improved dynamic seal for oil sealing applications in which a radial seal is combined with a facial excluder seal for use in highly contaminated environments.

It is another object of the present invention to provide for a novel and improved seal assembly of a radial seal and facial excluder seal in which the excluder seal always maintains sealing engagement with its intended counterface notwithstanding wide axial assembly tolerances which may exist between the shaft and housing in which the seal assembly is installed; and further wherein the radial seal and facial seal can be preassembled such that they can fit into extremely narrow axial spaces.

A further object of the present invention is to provide for a preassembled radial seal and facial excluder seal in which a labyrinth is formed to protect the excluder seal from exposure to contaminants, and the excluder seal being further operative to propel contaminants away from the sealing area.

2

It is an additional object of the present invention to provide for a novel and improved oil seal assembly of the type having a radial seal to be installed in sealing contact with a rotating shaft to provide a mechanism for guiding the radial seal onto the splined shaft during installation in such a way as to guide the splines of the shaft past the radial seal without damaging the radial seal.

In accordance with the present invention, there has been devised a dynamic seal assembly for installation between an inner rotating shaft and outer non-rotating housing comprising a first ring for fixed engagement with the housing including an annular radial seal extending from the first ring into sliding contact with the shaft, a second ring mounted on the first ring including a radial flange in pressfit engagement with the shaft, and an annular excluder seal mounted on the second ring for slidable engagement with the first ring radially outwardly of the radial seal. Preferably, the first ring includes a generally U-shaped channel portion having a first axially extending portion in pressfit engagement with the housing and a second axially directed portion to which the radial seal is connected, and the excluder seal is defined by an annular sealing skirt extending radially outwardly from the second ring into overlapping relation to an end wall of the housing. An axial leg of the second ring is inserted into the channel-shaped portion to form a labyrinth to discourage entry of contaminants into contact with the radial seal, and the inner diameter of the second ring is covered with a rubber or rubber-like material which is engageable with the shaft and helps to guide or pilot any splines on the shaft to minimize contact with the radial seal.

In modified forms of invention, a split ring is employed as the second ring to guide the shaft into the housing and has an excluder seal at one end of the axial leg which bears against an end wall of the channel-shaped portion of the first ring to define an excluder seal radially outwardly of the radial seal.

The above and other objects of the present invention will become more readily appreciated and understood from a consideration of the following detailed description of preferred and modified forms of the present invention when taken together with the accompanying drawings in which:

DETAILED DESCRIPTION OF PREFERRED EMBODIMENT

Figure 5:
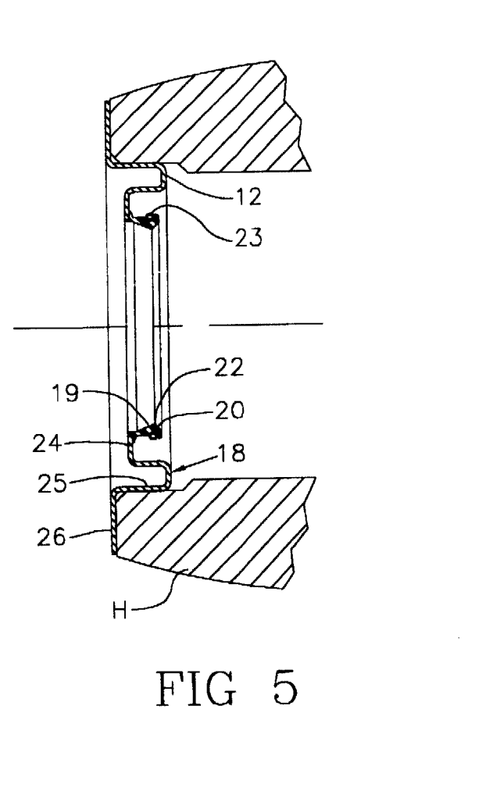
FIG. 5 is a cross-sectional view of a radial seal installed within a housing of a wheel.
Figure 6:
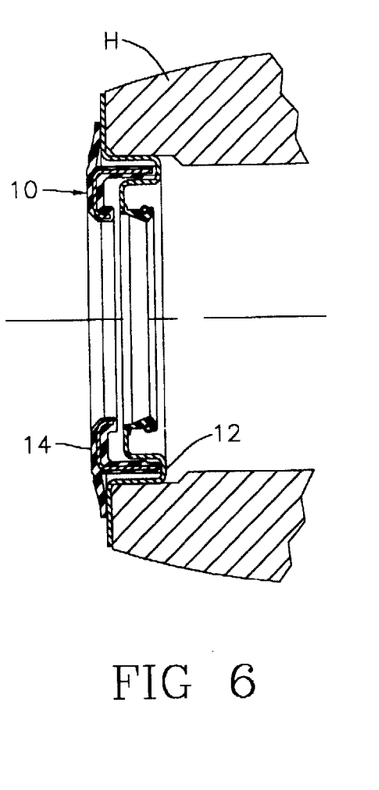
FIG. 6 is a cross-sectional view of a unitized oil seal assembly installed in a housing.
Figure 7:
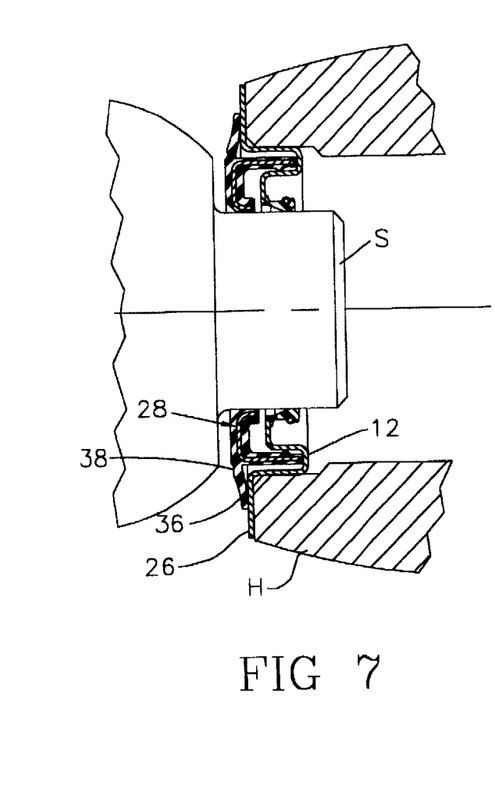
FIG. 7 is a cross-sectional view of a unitized oil seal assembly after insertion of a shaft therethrough.

Referring in more detail to the drawings, there is illustrated in FIGS. 5 to 7 a preferred form of oil seal assembly 10 which is broadly comprised of a radial seal subassembly 12 and an excluder seal subassembly 14, the subassembly 14 being inserted into the subassembly 12 as shown, and the entire assembly 10 being inserted into a stationary housing H for reception of a shaft S which is inserted into the assembly 10 as best seen from FIG. 7. FIG. 5 illustrates mounting of the subassembly 12 alone in the housing H, the subassembly comprising an annular radial seal 16 at the radially inner end of an endless ring or casing 18. The radial seal 16 has oppositely tapered frustoconical surfaces 19 and 20 intersecting at a minimum diameter ridge 22, the one tapered side 19 being securely affixed, such as, by molding to a radially inner, axially extending portion 24 of the casing 18. Casing 18 may be composed of a suitable plastic or metal material and includes a generally U-shaped channel 25 forming a radially outward continuation of the radially inner portion 24, and the radially outer side of the channel 25 terminates in an axially extending portion 26. When installed onto the end wall of the housing H, the outer side of the channel 25 will be disposed in pressfit engagement to the inner diameter of the housing and cause the axially extending portion 26 to be firmly seated against the end wall of the housing, as best seen from FIG. 5. In this relation, the radially inner portion 24 is inset into the housing slightly with respect to the radially outer portion 26 to afford ample clearance for installation of the excluder seal subassembly 14 in a manner to be described. A garter spring 23 encircles the seal 16 to maintain a predetermined bias force on the seal 16 when installed on a cylindrical surface, such as, the shaft S, the seal 16 being mounted at a radially inside edge of the portion 24 for inboard axial extension away from the inner edge.

Figure 1:
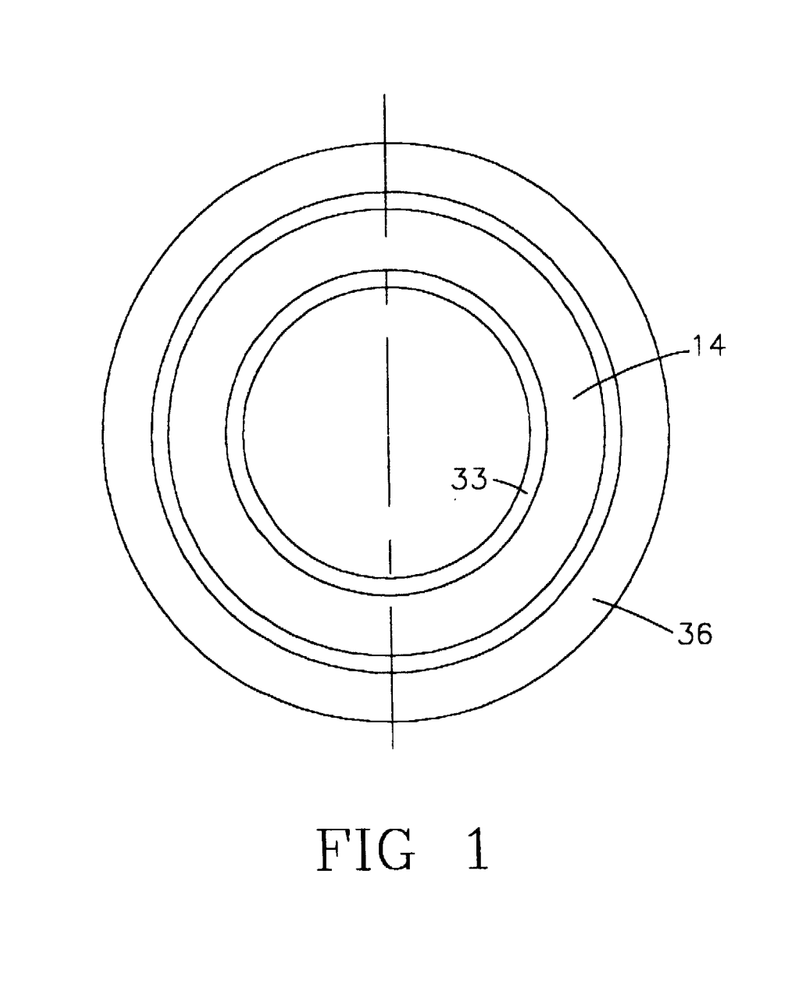
FIG. 1 is a plan view of a preferred form of excluder seal in accordance with the present invention.
Figure 2:
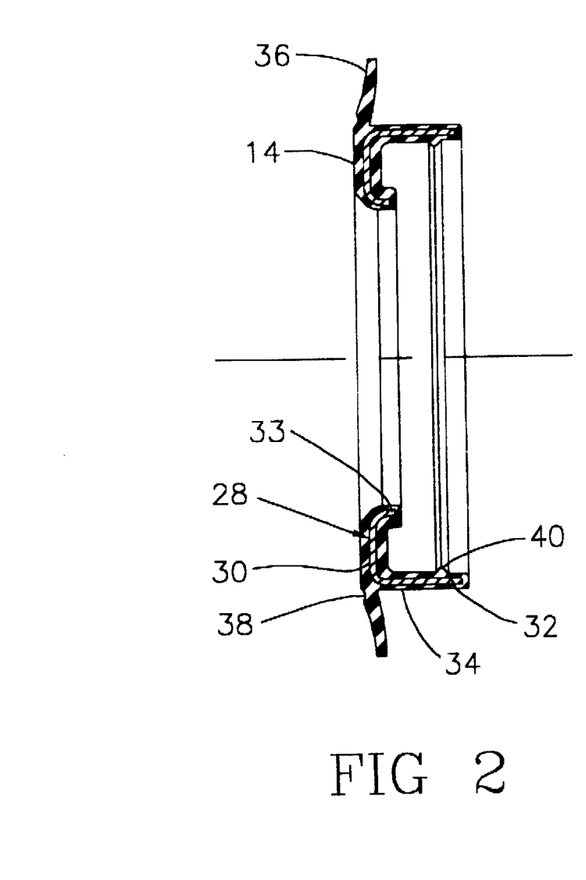
FIG. 2 is a cross-sectional view of the seal shown in FIG. 1.
Figure 3:
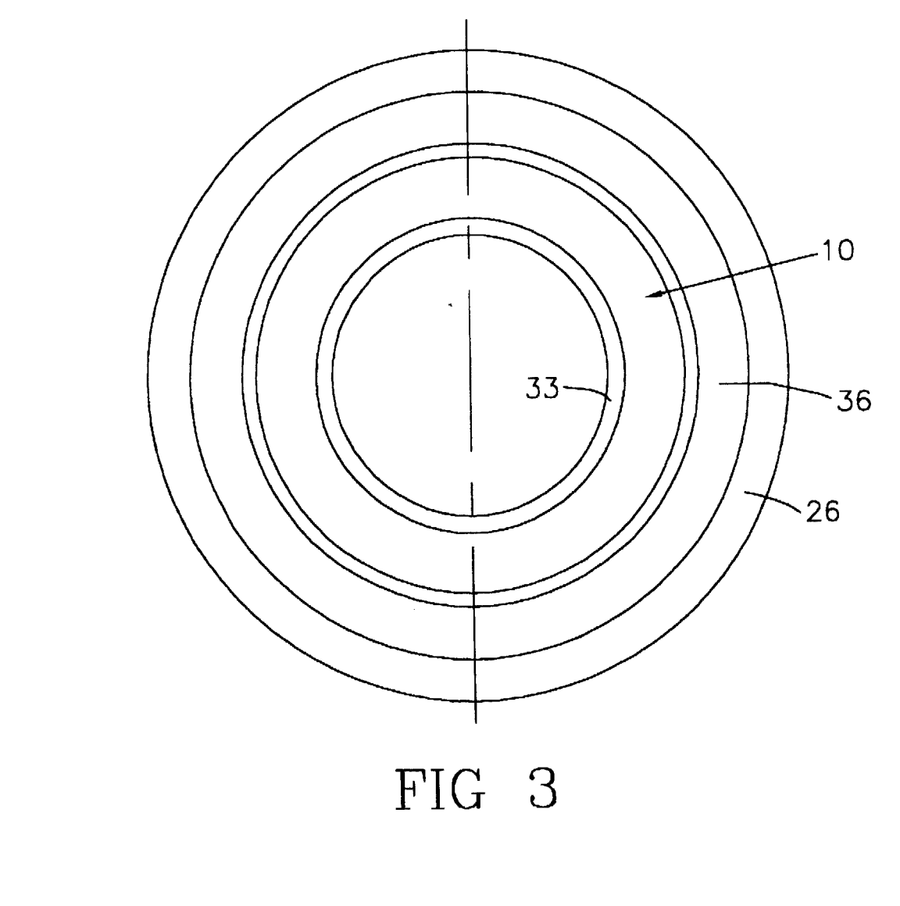
FIG. 3 is a plan view of a unitized oil seal assembly incorporating the excluder seal of FIGS. 1 and 2 therein.
Figure 4:
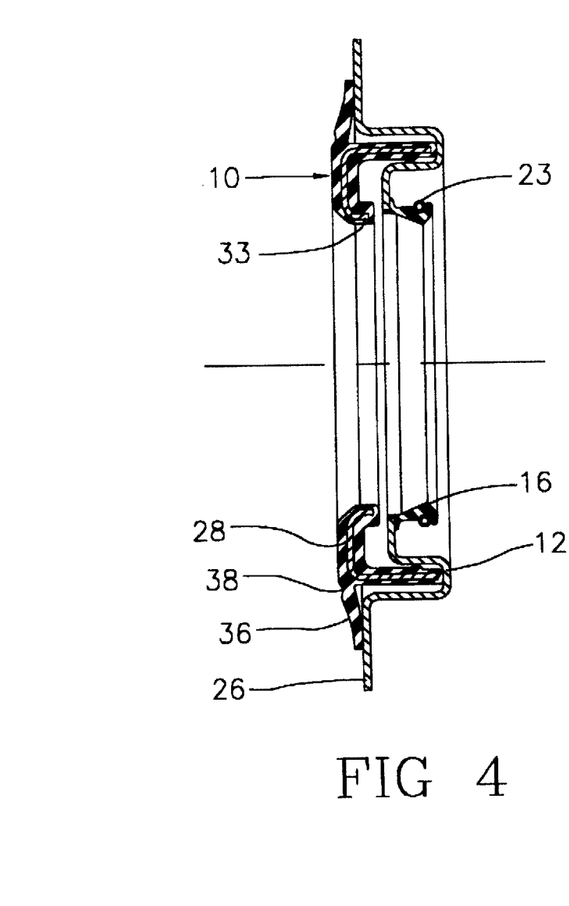
FIG. 4 is a cross-sectional view of the seal assembly shown in FIG. 3.

The excluder seal subassembly 14 is illustrated in detail in FIGS. 1 and 2 and is comprised of an endless or solid ring 28 of plastic or metal construction which in cross-section is of generally L-shaped configuration including a radial portion 30 and an axial leg portion 32, the radial portion 30 terminating in a radially inner axial return portion 33 of limited length in relation to the length of the axial portion 32. The ring 28 is encased, such as, by molding into an outer covering of a rubber or rubber-like material 34 which has a unitary radially outwardly extending sealing skirt 36. The sealing skirt defines an excluder seal in the form of a flexible extension away from the radially extending portion 30 of the excluder seal and is angled slightly in an inboard direction with a slight reduction in cross-sectional thickness as at 38 to define a hinge section for increased flexibility of the skirt 36 in maintaining uniform sealed engagement with the axially extending portion 26 on the end wall of the housing notwithstanding any slight axial shifting or end play between the shaft S and housing H. In addition, the molded covering 34 includes an internal annular rib or bumper 40 which will retain the excluder seal subassembly 14 in position within the U-shaped channel 25 of the subassembly 12, as illustrated in FIGS. 6 and 7, prior to insertion of the shaft S into the housing. The bumper 40 is designed to subsequently wear away as the excluder seal subassembly 14 rotates with the shaft S with respect to the stationary radial seal subassembly 12. Accordingly, the bumper 40 is preferably of a slightly smaller diameter than the opposing axially directed leg of the channel 25. The sequence of the assembly process is illustrated in FIGS. 5, 6 and 7. As shown in FIG. 5, the radial seal subassembly 12 is first pressed into the housing H. As illustrated in FIG. 6, the excluder seal subassembly 14 is then inserted into the channel 25 of the radial seal subassembly 12 with the sealing skirt 36 in firm sealing engagement with the radially directed flange 26 of the subassembly 12. Finally, as shown in FIG. 7, the shaft S is inserted through the subassemblies 14 and 12, the compression fit of the subassembly 14 being much tighter than the fit of the rib 40 with respect to the channel 25 so that when the excluder seal subassembly 14 rotates with the shaft S, the rib 40 will wear away from the channel 25. Accordingly, it will be appreciated that the installation process involves installing the excluder seal subassembly into the channel 25 of the radial seal subassembly 12 prior to inserting the shaft S through the radial seal subassembly 12, as opposed to existing designs in which the excluder seal is installed onto the shaft prior to inserting the shaft through the radial seal. In this way, the excluder seal 36 always maintains its position relative to the counterface 26 on the radial seal subassembly notwithstanding axial assembly tolerances between the shaft S and housing H.

Another feature of the present invention resides in the manner in which the axial leg 32 of the excluder seal subassembly 14 fits inside of the U-shaped channel 25 of the radial seal subassembly 12 so as to form a labyrinth to discourage the flow of any contaminants which may bypass the main sealing skirt 36 from reaching the radial seal 16. Furthermore, the telescoping relationship established between the subassemblies 12 and 14 effectively reduces the overall axial width of the entire assembly and in this way is able to be installed into relatively confined axial spaces. Still further, the inner diameter of the excluder seal covering around the return portion 33, being slightly smaller than the shaft S, helps to guide or pilot any splines on the shaft S through the center of the radial seal 16 thereby reducing the possibility that the radial seal 16 will be cut or nicked by any sharp edges or burs on the splines of the shaft.

DETAILED DESCRIPTION OF MODIFIED FORMS OF INVENTION

Figure 8:
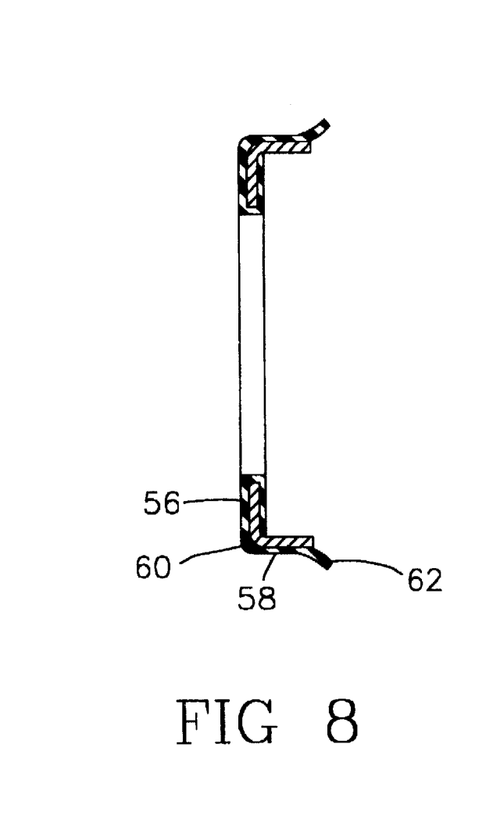
FIG. 8 is a plan view of a modified form of split ring seal.
Figure 9:
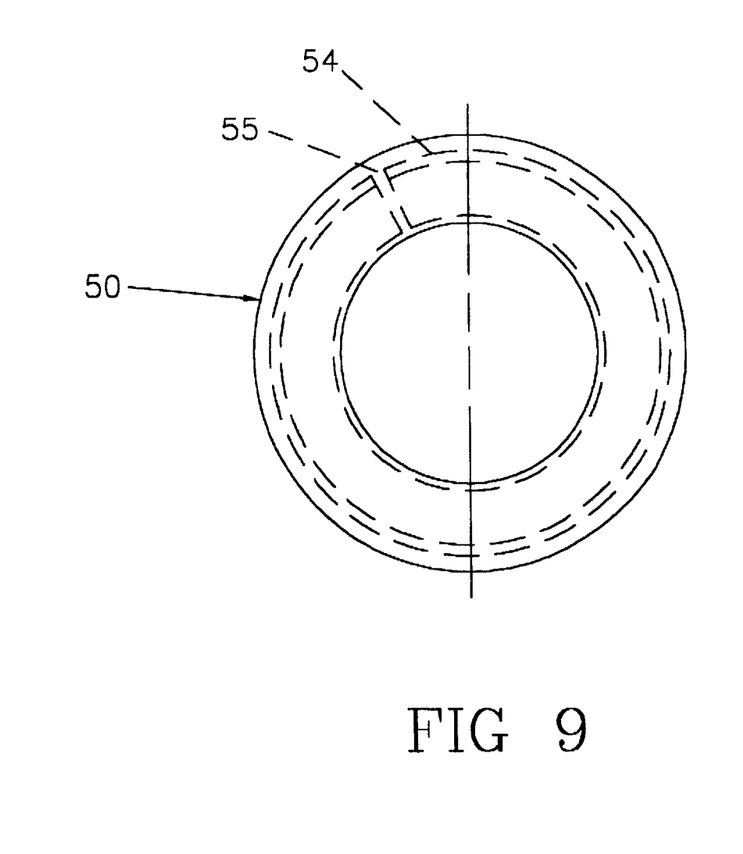
FIG. 9 is a cross-sectional view of the seal shown in FIG. 8.
Figure 10:
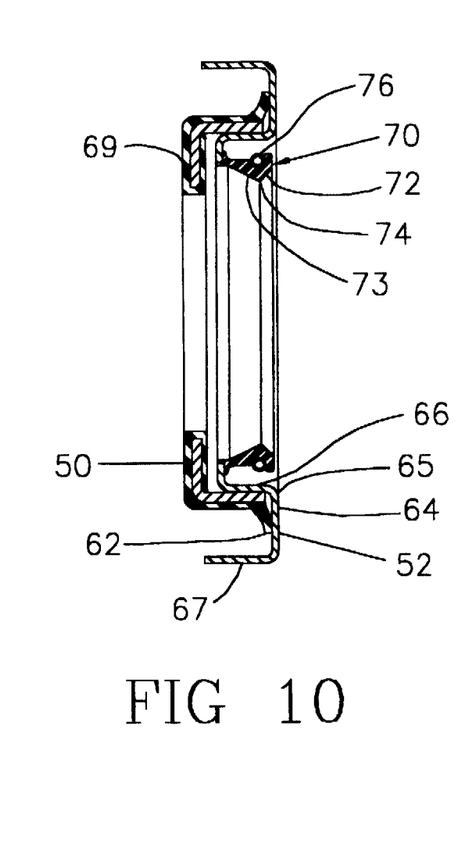
FIG. 10 is a cross-sectional view of the modified form of seal assembly incorporating the split ring seal of FIGS. 8 and 9.
Figure 11:
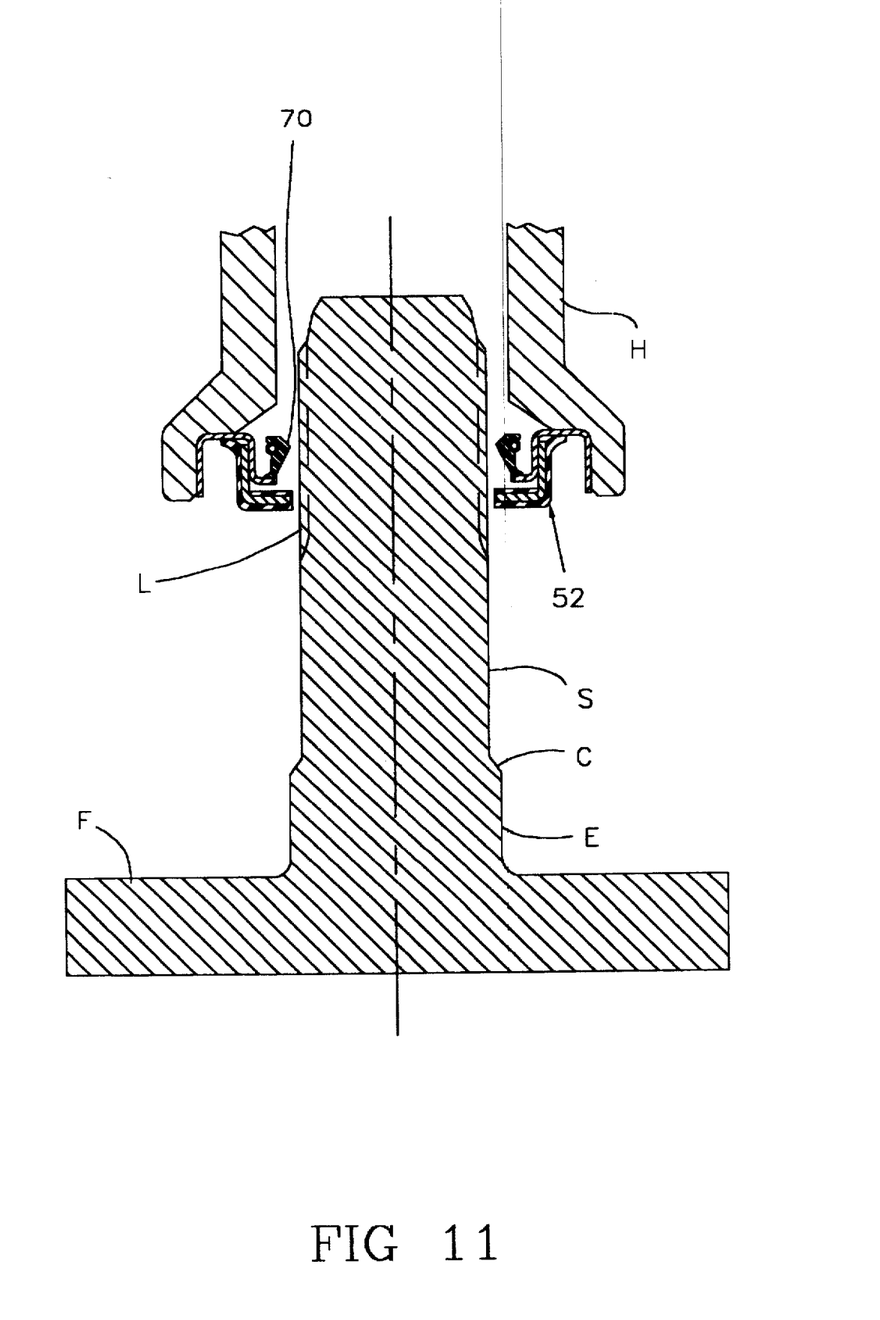
FIG. 11 is a sectional view illustrating the modified form of seal assembly of the present invention being guided over the splined portion of a shaft.
Figure 12:
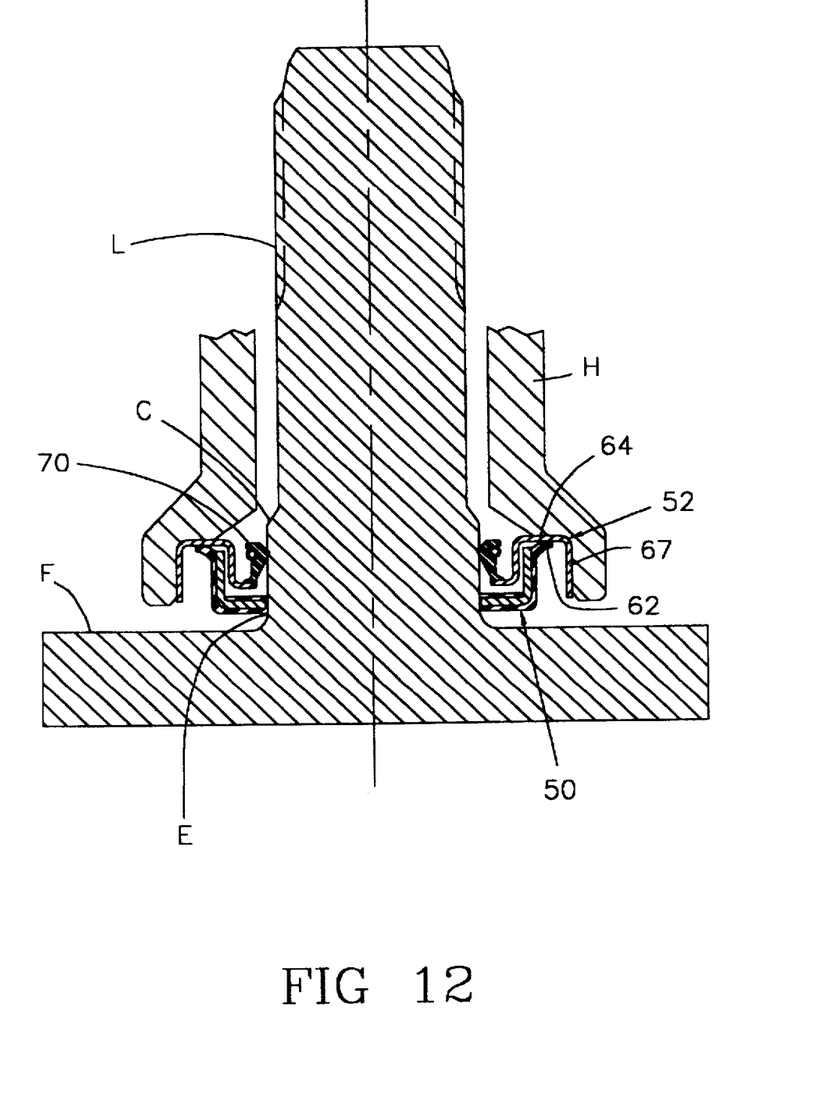
FIG. 12 is another sectional view similar to FIG. 11 but illustrating the seal assembly installed on a sealing area of a shaft after passing over the splined portion.

FIGS. 8 and 9 illustrate a split seal 50 forming a part of a seal assembly 52 as shown in FIGS. 10 to 12. The split seal 50 is of annular configuration including a split ring 54 provided with a radial gap 55, the ring being composed of a plastic or metal material having limited resiliency. In cross-section, the ring is of generally L-shaped configuration, as seen from FIG. 9, including a radial portion 56 and axial leg portion 58. The radial portion 56 is encased in a covering or coating of a rubber or rubber-like material 60, the covering extending axially along an external surface of the axial leg 58 and terminating beyond the axial leg in an axially directed but radially outwardly flared seal lip 62.

The radial seal assembly 52 is made up of an annular casing 64 of suitable plastic or metal material and which defines a generally U-shaped channel having a closed end 65, a radial inner, axially extending surface 66 and radial outer, axially extending surface or side 67. Mounted in inner concentric spaced relation to the surface portion 66 is an annular radial seal 70 having oppositely tapered frustoconical surfaces 72 and 73 intersecting at a minimum diameter ridge 74. A garter spring 76 encircles the seal 70 to maintain a predetermined bias force on the seal when installed on a cylindrical surface to be hereinafter described. The seal 70 is mounted at a radially inside edge of portion 66 for axial extension away from the inner edge.

The split ring 50 of the present invention has a diameter across the axial leg portion 58 which is slightly less than the diameter across the radially inner leg or side portion 66 of the casing 64 so that the split ring 50 must undergo slight circumferential expansion for installation, as shown in FIG. 10, into snugfitting engagement with the leg portion 66. The split ring is fully sealed as shown so that the lip seal 62 is firmly pressed or seated against the axially extending portion 66 of the casing, the radial portion 66 of the split ring and its covering 60 bear against the radially inwardly extending flange portion 69 of the casing; and the lip seal 62 bears firmly against the radial portion 65 of the casing. In this unitized relation between the split ring 50 and casing 64, the radial portion 56 has a smaller diameter than that of the radial seal 70 in order to serve as a pilot or guide to minimize, if not prevent, contact between the seal 70 and shaft on which it is to be assembled in a manner now to be described.

FIGS. 11 and 12 illustrate installation of the seal assembly 52 in a housing or bore generally designated at H, following which a shaft S is advanced through the seal assembly 52. In a typical application for a motor vehicle housing, the shaft S is splined as at L and includes a shoulder portion E at one end upon which the seal assembly 52 is to be mounted. It is important to prevent accidental engagement of the radial seal 70 with the external surface of the shaft S and particularly along the splined portion where burrs or other imperfections may cause damage to the seal 70. Accordingly, the radial portion of the split ring seal 50 is dimensioned to be of an inner diameter across radial portion 56 slightly greater than the shaft S but slightly less than that of the shoulder E. In turn, the radial seal 70 is dimensioned to be of a diameter slightly greater than that of the inner diameter of the split seal 50 as described but less than that of the shoulder E.

When the seal assembly 52 is advanced along the shaft, it will move into contact with the chamfered area C leading into the shoulder or sealing area E whereupon the split ring 50 will expand thereby lifting off of the inner leg portion 66 of the casing. The inner diameter across the radial portion 56 will of course remain in firm sealed engagement with the area E so as to rotate with the shaft and form a static seal between the inside diameter of the split ring and the sealing area E as well as to act as a deflector for contaminants seeking to enter the sealing area. The facial seal lip 62 on the split ring is loaded in an axial direction against the mating surface of the casing by the radially outward expansion of the split ring so as to act as a facial excluder seal to prevent ingress of contaminants past the seal when the shaft is rotated and the seal assembly placed in service.

It is therefore to be understood that while preferred and modified forms of invention are herein set forth and describe, various modifications and changes may be made in the construction and arrangement of parts as well as composition of materials without departing from the spirit and scope of the invention as defined by the appended claims and reasonable equivalents thereof.

We claim:

1. A dynamic seal assembly for installation between an inner rotating shaft and outer non-rotating housing comprising:

a first ring for fixed engagement with said housing including an annular radial seal extending from said first ring into sliding contact with said shaft;

a second ring including means mounting said second ring on said first ring whereby to position said second ring in fixed axial relation to said first ring prior to installation on said shaft, said second ring including a radial flange in pressfit engagement with said shaft; and an annular excluder seal mounted on said second ring for slidable engagement with said first ring radially outwardly of said radial seal.

2. The assembly according to claim 1 wherein said excluder seal is disposed outboard of said radial seal.

3. The assembly according to claim 1 wherein said first ring includes a generally U-shaped channel portion having a first axially extending portion in pressfit engagement with said housing and a second axially directed portion to which said radial seal is connected.

4. The assembly according to claim 1 wherein said first ring includes a generally channel-shaped portion having one side in press fit engagement with said housing, and said excluder seal being defined by an annular sealing skirt extending radially outwardly from said second ring into overlapping relation to an end wall of the housing.

5. The assembly according to claim 1 wherein said second ring includes a portion disposed in telescoping relation to a channel-shaped portion of said first ring.

6. The assembly according to claim 5 wherein said second ring is rotatable with respect to said first ring and said mounting means includes a wearable surface portion engageable with said first ring.

7. A dynamic seal assembly for installation between an inner rotating shaft and outer non-rotating housing comprising:

a first ring in pressfit engagement with said housing including an annular radial lip seal extending from said first ring into sliding contact with said shaft;

a second ring including a radially extending portion in pressfit engagement with said shaft and a facial excluder seal in slidable contact with a radially extending portion of said first ring at a location radially outwardly of said radial seal; and wherein said first ring includes a generally U-shaped channel portion having a first axially extending portion in pressfit engagement with said housing and a second axially directed portion upon which said radial seal is mounted, and wherein said second ring includes an axially extending portion disposed in telescoping sealed relation to said U-shaped channel portion.

8. The assembly according to claim 7 wherein said excluder seal is in the form of a sealing skirt projecting radially outwardly from a radially extending portion of said second ring.

9. The assembly according to claim 8 wherein said sealing skirt includes a hinge section of reduced cross-sectional thickness.

10. The assembly according to claim 7 wherein said second ring includes an outer covering of rubber or rubber-like material, and said excluder seal is in the form of a sealing skirt integral with said outer covering and extending radially outwardly therefrom.

11. The assembly according to claim 7 wherein said radial seal includes a radially inwardly tapered lip in sliding contact with said rotating shaft.

12. The assembly according to claim 7 wherein said second ring is rotatable with said shaft and includes a wearable surface portion engageable with said first ring.

13. A dynamic seal assembly for installation between an inner rotating shaft and outer relatively non-rotating housing comprising:

a first solid ring for fixed engagement with said housing including an annular radial lip seal extending from said first ring into sliding contact with said shaft;

a second ring mounted on said first ring including an outer covering of rubber or rubber-like material and a radial flange having an axial return portion in pressfit engagement with said shaft, said second ring being rotatable with respect to said first ring and including an axial leg;

an annular excluder seal mounted on said second ring for slidable engagement with said first ring radially outwardly of said radial seal; and wherein said first ring includes a generally channel-shaped portion into which said axial leg is inserted, and said second ring having an annular sealing skirt extending radially outwardly from said second ring into overlapping sealed relation to a radially extending portion of said first ring.

14. The assembly according to claim 13 wherein said first ring includes a generally U-shaped channel portion having a first axially extending portion in pressfit engagement with said housing and a second axially directed portion upon which said radial lip seal is mounted.

15. The assembly according to claim 13 wherein said second ring includes a portion disposed in telescoping relation to said channel-shaped portion of said first ring.

16. The assembly according to claim 13 wherein said sealing skirt includes a hinge section of reduced cross-sectional thickness.

\* \* \* \* \*